(12) United States Patent
Musschoot et al.

(10) Patent No.: US 6,237,749 B1
(45) Date of Patent: May 29, 2001

(54) MOTOR BASE FOR VIBRATORY APPARATUS

(75) Inventors: Paul Musschoot, Marengo; Richard B. Kraus, Barrington, both of IL (US)

(73) Assignee: General Kinematics Corporation, Barrington, IL (US)

( * ) Notice: Subject to any disclaimer, the term of this patent is extended or adjusted under 35 U.S.C. 154(b) by 0 days.

(21) Appl. No.: 09/422,317

(22) Filed: Oct. 21, 1999

(51) Int. Cl.$^7$ ................................................. B65G 27/20
(52) U.S. Cl. ................................. 198/770; 74/61; 74/87
(58) Field of Search .......................... 198/770; 74/61, 74/87

(56) References Cited

U.S. PATENT DOCUMENTS

| | | | |
|---|---|---|---|
| 2,899,044 | * 8/1959 | Allen et al. | 198/770 |
| 3,169,108 | * 2/1965 | Dietert | 24/61 |
| 3,991,524 | 11/1976 | Ferrara | 51/163.1 |
| 4,731,959 | 3/1988 | Musschoot | 51/417 |
| 5,024,320 | 6/1991 | Musschoot | 198/756 |
| 5,131,525 | 7/1992 | Musschoot | 198/770 |

FOREIGN PATENT DOCUMENTS 0 186 357 B1   3/1993 (EP) .................. B24B/31/00

OTHER PUBLICATIONS

Tens–A–Matic, Pivoted Motor Bases, Bulletin #, pp. 1–8, Murray Euipment Co., Inc., Detroit, Michigan, "Standard & Extra Heavy Duty Series For Belt Drives".

* cited by examiner

Primary Examiner—Joseph E. Valenza
(74) Attorney, Agent, or Firm—Marshall O'Toole, Gerstein, Murray & Borun

(57) ABSTRACT

A motor base for use in vibratory apparatus. The vibratory apparatus includes at least one eccentric drive having a driven shaft rotatably mounted on a moveable exciter. A motor is provided having a motor shaft which is spaced from the eccentric drive and coupled to the eccentric drive by a drive belt. Rotation of the motor is transferred by the drive belt to the eccentric drive, which generates a vibrational force. The vibrational force moves the exciter in various directions during operation of the vibratory apparatus. The motor base comprises a rigid support, such as an arm, having a free end adapted to carry the motor. The arm is supported to move about an axis of the driven shaft, so that the arm maintains a center distance between the motor shaft and the driven shaft. A resilient support, such as a compression spring, is attached to the free end of the arm, below the motor, to absorb any resulting forces acting on the arm from the movement of the exciter. The motor base maintains a center distance between the motor shaft and the driven shaft, thereby increasing drive belt life by minimizing tension variations in the drive belt.

19 Claims, 3 Drawing Sheets

MOTOR BASE FOR VIBRATORY APPARATUS

FIELD OF THE INVENTION

The present invention is generally related to motor bases and, more particularly, to bases for supporting motors used in vibratory apparatus.

BACKGROUND OF THE INVENTION

As is well known in the art, vibratory processing equipment has been developed to satisfy a wide range of diverse applications. It is oftentimes the case that a system for handling any of a variety of different materials will include as an integral component an exciter for generating vibration. Generally, the exciter is used in a variety of applications, typically to transport a material to and through a processing section to a post-processing section, such as in a vibratory conveyor for transporting materials along a generally horizontal path, or in a spiral elevator for vertically transporting materials.

Exciters used in vibratory apparatus typically include a frame resiliently connected to a conveyor or other structure which carries the process material. At least one, and typically two, rotatable shafts are supported on the frame. Each shaft carries an eccentric weight which creates a vibrational force as it rotates with the shaft. A motor is provided to drive the driven shaft. The motor has a motor shaft, and a drive belt is entrained about the motor shaft and the driven shaft. Accordingly, rotation of the motor shaft moves the drive belt which, in turn, causes the driven shaft to rotate. The rotating eccentric weight attached to the driven shaft creates the vibrational force which is imparted to the exciter flame. Vibration of the exciter is transferred, such as by reactor springs, to the conveyor or other structure to effect the desired vibrational process.

During operation, it will be appreciated that the exciter may move in several directions. In vibratory apparatus used to produce a vertical vibration, for example, the exciter may vibrate or oscillate in different directions during startup, normal operation, and shutdown of the exciter. During startup, the driven shafts are initially at rest as the motor begins to rotate the shaft. Until the driven shafts reach normal operating speed, rotation of the eccentric weights may not be synchronized or may otherwise result in primarily horizontal movement of the exciter. During normal operation, the exciter oscillates in a generally vertical direction to impart the desired vibrational force. During shut down, the eccentric weights again may become out of synchronization, creating primarily horizontal movement of the exciter.

The varying movement of the exciter makes it difficult to reliably couple a motor to each driven shaft. Currently, each motor is typically fixed to a stationary support, such as a base frame or the ground. As a result, movement of the exciter varies the distance between each motor shaft and respective driven shaft, so that the tension in the drive belt is also varied. The varying tension causes the belt to slip during operation, and often creates excessive wear on the belt, leading to premature belt failure.

Another type of motor base for vibratory apparatus, marketed as the "TENS-A-MATIC" pivoted motor base by Murray Equipment Co., Inc. located in Detroit, Mich., provides a base which allows the motor to pivot with respect to the driven shaft. The base includes a pair of arms which is supported for pivoting about a pivot axis. The motor is positioned on the arms such that an increase in motor load (e.g. starting load) creates a reaction torque which pushes down on the arms. The pivot axis is located below the arms such that downward movement of the arms increases the distance between the motor shaft and the driven shaft. When the motor load returns to normal (e.g., motor reaches fill speed), the reaction torque dissipates and the arms swing upward, decreasing the distance between the motor shaft and the driven shaft. To compensate for overly heavy motor loads, a spring may be attached to the arms below the motor which prevents the arms from pivoting too far. The pivot motor base allows the distance between the motor shaft and driven shaft to vary according to motor load, and therefore the drive belt is still subject to wear, as detailed above.

The present invention is directed to overcoming one or more of the foregoing problems while achieving one or more of the resulting objects by providing a unique motor base for vibratory apparatus.

SUMMARY OF THE INVENTION

According to certain aspects of the present invention, a motor base is provided for use in vibratory apparatus. The vibratory apparatus has an eccentric drive mounted on an exciter which includes a driven shaft rotatably mounted on the exciter and disposed along a driven shaft axis. The apparatus further includes a motor having a motor shaft disposed along a motor shaft axis, the motor shaft axis being spaced from and parallel to the driven shaft axis, and a drive belt operably coupled to the driven shaft and the motor shaft. The motor base comprises a rigid support journally supported for moving about the driven shaft axis, the rigid support having a free end adapted to carry the motor and pivoting in response to movement of the exciter. A resilient support has a first end attached to the free end of the rigid support and a fixed second end, and the resilient support is sized to suspend the motor and rigid support and to move in response to movement of the exciter acting on the rigid support. The motor base maintains a constant center distance between the driven shaft axis and the motor shaft axis as the rigid support and resilient support move in response to movement of the exciter.

In accordance with additional aspects of the present invention, a motor base is provided for use in vibratory apparatus having an eccentric drive mounted on an exciter. The eccentric drive includes a driven shaft which is rotatably mounted on the exciter and disposed along a driven shaft axis. The exciter includes a bracket attached thereto, and a motor having a motor shaft disposed along a motor shaft axis, the motor shaft axis being spaced from and parallel to the driven shaft axis. A drive belt is operably coupled to the driven shaft and the motor shaft. The motor base comprises a rigid arm attached to the bracket and supported for movement relative to the driven shaft axis. The arm has a free end adapted to carry the motor and moves in response to movement of the exciter. A spring has a first end attached to the free end of the arm and a fixed second end, the spring being sized to suspend the motor and moving in response to movement of the exciter acting on the arm. The motor base maintains a constant center distance between the driven shaft axis and the motor shaft axis as the arm and spring move in response to movement of the exciter.

In accordance with still further aspects of the present invention, a vibratory apparatus is provided which comprises a material-carrying member. An exciter is resiliently connected to the material-carrying member, and includes a driven shaft journaled thereon and an eccentric weight mounted on the driven shaft. The driven shaft is rotatable about a driven shaft axis, wherein the eccentric weight generates a vibrational force which moves the exciter. A rigid support is journally supported for movement relative to the driven shaft axis, and has a free end spaced from the driven shaft axis, the rigid support moving in response to movement of the exciter. A motor is attached to the free end of the rigid support, and has a motor shaft with a motor shaft axis, the motor shaft axis being spaced from and parallel to the driven shaft axis. A resilient support has a first end attached to the free end of the rigid support and a fixed second end, the resilient support being sized to suspend the motor and the rigid support and moving in response to movement of the exciter acting on the rigid support. A drive belt is operably coupled to the motor shaft and the driven shaft. The motor base maintains a substantially constant center distance between the driven shaft axis and the motor shaft axis as the rigid support and the resilient support move in response to movement of the exciter.

Other objects, advantages and features of the present invention will become apparent from a consideration of the following specification taken in conjunction with the accompanying drawings.

DETAILED DESCRIPTION OF THE PREFERRED EMBODIMENTS

Figure 1:
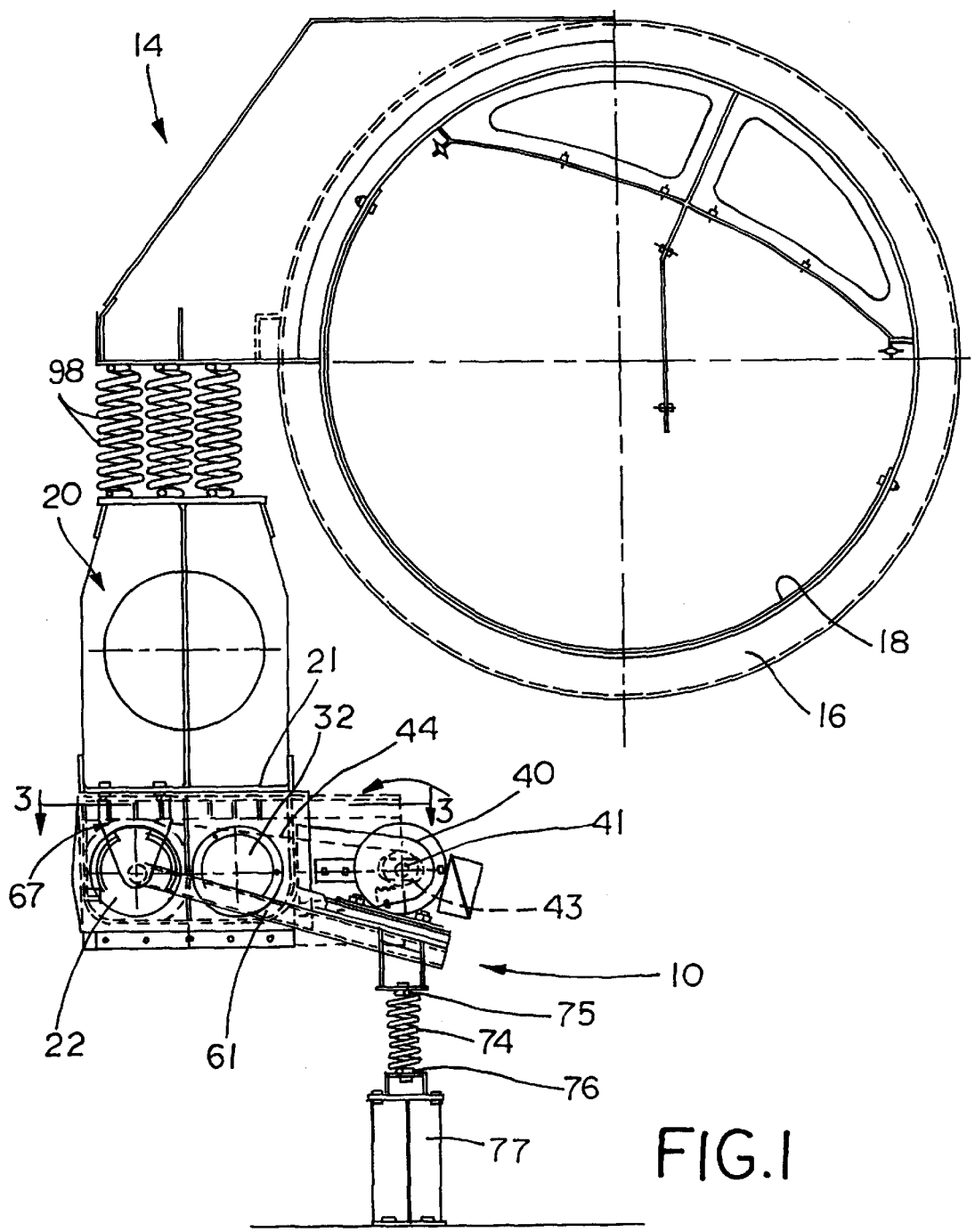
FIG. 1 is an end view of a vibratory apparatus incorporating a motor base in accordance with the teachings of the present invention.
Figure 2:
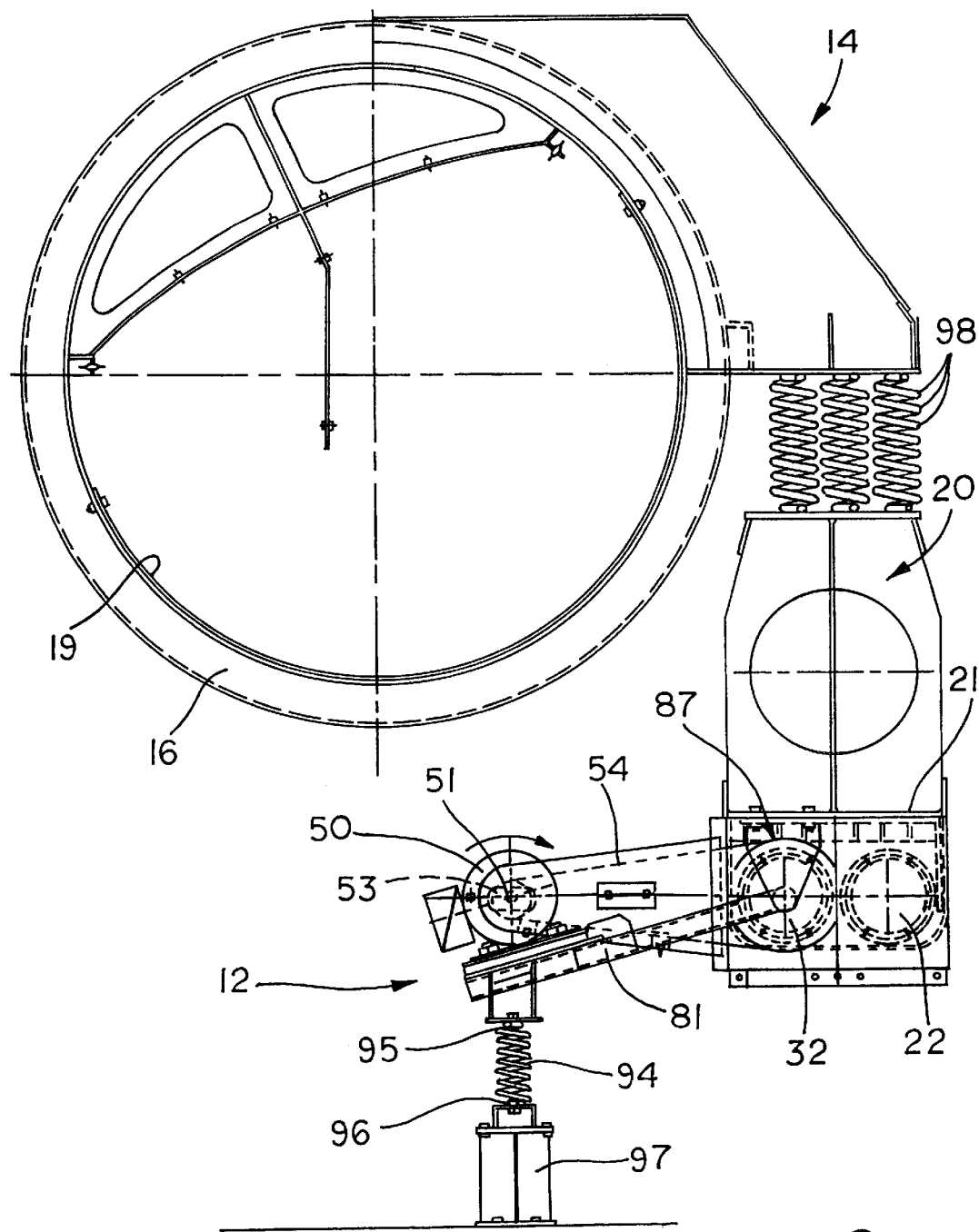
FIG. 2 is an end view opposite of FIG. 1 showing the vibratory apparatus and motor base.
Figure 3:
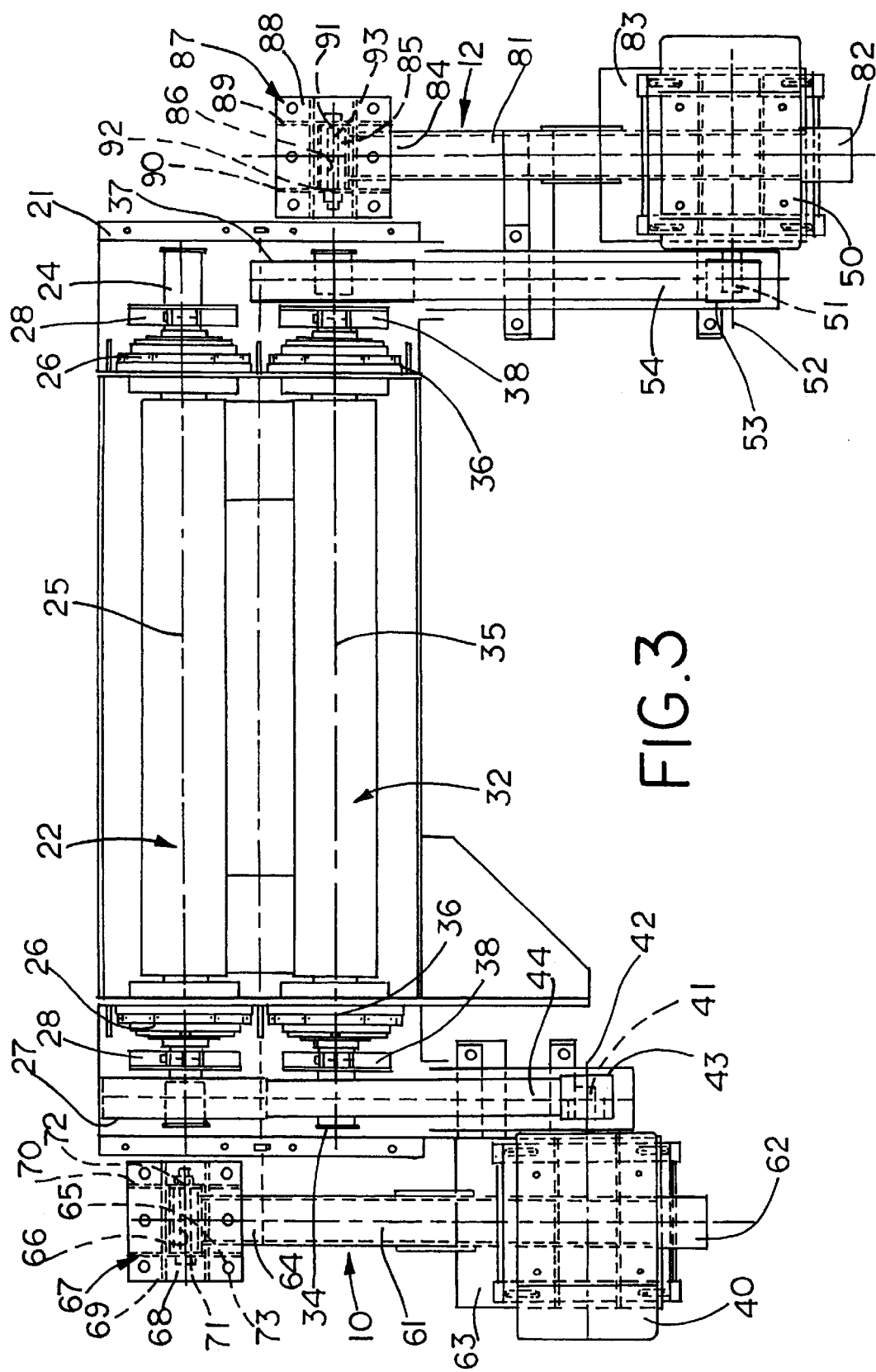
FIG. 3 is a plan view of the motor base taken generally along the lines 3—3 of FIG. 1.

In the illustrations given herein, and with particular reference first to FIGS. 1–3, the reference numbers 10, 12 will be understood to designate generally a first and a second motor base, in accordance with the teachings of the present invention. As shown in FIGS. 1 and 2, the motor bases 10, 12 are incorporated into a vibratory apparatus 14 having a material-crying member 16 which defines a vibrated path extending from an inlet 18 (FIG. 1) to an outlet 19 (FIG. 2). The vibratory apparatus includes an exciter 20 for imparting a vibrational force to the material-carrying member 16 and creating the vibrated path.

The exciter 20 includes a base frame 21 onto which are rotatably journaled a pair of eccentric drives 22, 32 for generating the vibrational force. As best shown in FIG. 3, a first eccentric drive 22 includes a driven shaft 24 aligned along a first driven shaft axis 25 and supported for rotation by a pair of bearings 26 attached to the base frame 21. A driven wheel 27 is attached to one end of the first driven shaft 22. The first driven shaft 22 is eccentrically loaded, such as with eccentric weights 28. A second eccentric drive 32 is assembled similar to the first eccentric drive 22, and includes a driven shaft 34 disposed along a second driven shaft axis 35 and supported for rotation by a pair of bearings 36 attached to the base frame 21. A driven wheel 37 is attached to one end of the second driven shaft 32, and the second driven shaft 32 is eccentrically loaded with eccentric weights 38.

First and second motors 40, 50 are provided for driving the eccentric drives 22, 32. As shown in FIGS. 1 and 3, the first motor 40 is spaced from the first driven shaft 24 and has a motor shaft 41 aligned along an axis 42 generally parallel to the first driven shaft axis 25. A drive wheel 43 is attached to the motor shaft 41, and a first drive belt 44 is entrained about the drive wheel 43 and driven wheel 27, so that rotation of the motor shaft 41 is transferred by the drive belt 44 to the first driven shaft 24. The second motor 50, as shown in FIGS. 2 and 3, is spaced from the second driven shaft 34 and has a motor shaft 51 aligned along an axis 52 generally parallel to the second driven shaft axis 35. A drive wheel 53 is attached to the motor shaft 51, and a second drive belt 54 is entrained about the drive wheel 53 and driven wheel 37, so that rotation of the motor shaft 51 drives the second driven shaft 34 via the second drive belt 54.

In accordance with certain aspects of the present invention, first and second motor bases 10, 12 are provided for supporting the first and second motors 40, 41. As best shown in FIGS. 1 and 3, the first motor base 10 comprises a rigid support, such as arm 61, having a free end 62 for carrying the first motor 40. In the preferred embodiment, a motor table 63 is attached to the free end 62 and is sized to support the first motor 40. A fixed end 64 of the arm 61 is supported for movement relative to the first driven shaft axis 25. In the illustrated embodiment, a resilient connection member, such as a rubberized bushing 65, is attached to the fixed end 64 of the arm 61 and defines a center bore 66. A first bracket 67 comprising a base plate 68 and a pair of side walls 69, 70 is attached to the base frame 21 of the exciter 20. Each side wall 69, 70 has an aperture 71, 72 aligned with the first driven shaft axis 25. The rubberized bushing 65 is positioned between the side walls 69, 70 so that the center bore 66 of the rubberized bushing 65 is aligned with and extends between the apertures 71, 72 in the side walls 69, 70. A pin 73 is inserted through the apertures 71, 72 and the center bore 66 of the rubberized bushing 65 so that the arm 61 is secured to the bracket 67 and can undergo limited movement about the first driven shaft axis 25.

A resilient support, such as a compression spring 74, has a first end 75 attached to the free end 62 of the arm 61 below the first motor 40 (FIG. 1). A second end 76 of the spring 74 is fixed to a stationary support, such as a sub-support 77 of the vibratory apparatus 14 or the ground. The spring 74 is sized to suspend the mass of the motor 40 and arm 61. Because the arm 61 is connected to and extends between the exciter 20 and the resilient support, it will be understood that the pivoting movement of the arm 61 about the first driven shaft axis 25 is necessarily limited.

The second motor base 12 also includes a rigid support, such as arm 81, having a free end 82 for carrying the second motor 50. A motor table 83 is preferably attached to the free end 82 and is sized to support the second motor 50. A fixed end 84 of the arm 81 is supported for movement relative to the second driven shaft axis 35. In the illustrated embodiment, a resilient connection member, such as a rubberized bushing 85, is attached to the fixed end 84 of the arm 81 and defines a center bore 86. A second bracket 87 comprising a base plate 88 and a pair of side walls 89, 90 is attached to the base frame 21 of the exciter 20. Each side wall 89, 90 has an aperture 91, 92 aligned with the second driven shaft axis 35. The rubberized bushing 85 is positioned between the side walls 89, 90 so that the center bore 86 is aligned with and extends between the apertures 91, 92 in the side walls 89, 90. A pin 93 is inserted through the apertures 91, 92 and the center bore 86 of the rubberized bushing 85 so that the arm 81 is secured to the bracket 87 and can undergo limited pivoting movement about the second driven shaft axis 35.

A resilient support, such as a compression spring 94, has a first end 95 attached to the free end 82 of the arm 81 below the second motor 50 (FIG. 2). A second end 96 of the spring 94 is fixed to a stationary support, such as a sub-support 97 of the vibratory apparatus 14 or the ground. The spring 94 is sized to suspend the mass of the motor 50 and arm 81. Because the arm 81 is connected to and extends between the exciter 20 and the resilient support, it will be understood that the pivoting movement of the arm 81 about the second driven shaft axis 35 is necessarily limited.

In operation, the first and second motors 40, 50 drive the first and second eccentric drives 22, 32 to vibrate the exciter 20. Vibration of the exciter 20 is transferred, such as by reactor springs 98, to the material-carrying member 16. The exciter 20 may exhibit characteristic movements during different stages of operation of the vibratory apparatus 14. For example, during startup conditions, when the eccentric drives 22, 32 first begin to rotate, the eccentric weights 28, 38 may be positioned with respect to each other during rotation such that the resulting force oscillates the exciter 20 generally horizontally. Once operating speed is reached, the eccentric drives 22, 32 may vibrate the exciter 20 in a primarily vertical direction. During shutdown, the eccentric drives 22, 32 again may generate a primarily horizontal movement of the exciter 20. Accordingly, it will be appreciated that the driven shafts 24, 34 attached to the exciter 20 may move in various directions and in different manners during operation of the vibratory apparatus 14.

The first and second motor bases 10, 12 accommodate the various movements of the driven shafts 24, 34 while maintaining substantially constant center distances between the motor shaft axes 42, 52 and respective driven shaft axes 25, 35, in accordance with certain aspects of the present invention. The arms 61, 81 provide rigid connections between the motor shafts 41, 51 and the driven shafts 24, 34 so that the center distances are maintained. To absorb the resulting forces acting on the arms 61, 81, the arms 61, 81 may pivot and the springs 74, 94 may bend, extend, or compress in response to movement of the exciter. The arms 61, 81 pivot about their respective driven shaft axes 25, 35, so that the center distances remain unchanged during any pivoting of the arms 61, 81. By maintaining substantially constant center distances, the motor bases 10, 12 of the present invention not only minimize variations in tension in the drive belts 44, 54, thereby increasing drive belt life, but also allow the use of timing belts, which have teeth and more reliably transmit motor shaft rotation to the driven shafts 24, 34.

From the above, it will be appreciated that the present invention brings to the art a new and improved motor base for use in vibratory apparatus. The vibratory apparatus includes at least one eccentric drive having an driven shaft rotatably mounted on a moveable exciter. A motor is provided having a motor shaft which is spaced from the eccentric drive and coupled to the eccentric drive by a drive belt. Rotation of the motor is transferred by the drive belt to the eccentric drive, which generates a vibrational force. The vibrational force may move the exciter in various directions during startup, operation, and shutdown of the vibratory apparatus. The motor base comprises a rigid support, such as an arm, having a free end for carrying the motor. The arm is supported for pivoting movement about an axis of the driven shaft, so that the arm maintains a center distance between the motor shaft and the driven shaft. A resilient support, such as a compression spring, is attached to the free end of the arm, below the motor, to absorb any resulting forces acting on the arm from the movement of the exciter. Accordingly, the motor base maintains substantially constant center distances between the motor shaft axes and respective driven shaft axes, which increases drive belt life by minimizing tension variations in the drive belt.

While in the foregoing there have been set forth preferred embodiments of the invention, it will be appreciated that the details herein given may be varied by those skilled in the art without departing from the true scope and spirit of the appended claims.

What is claimed is:

1. A motor base for use in vibratory apparatus having an eccentric drive mounted on an exciter, the eccentric drive including a driven shaft rotatably mounted on the exciter and disposed along a driven shaft axis, a motor having a motor shaft disposed along a motor shaft axis, the motor shaft axis being spaced from and parallel to the driven shaft axis, and a drive belt operably coupled to the driven shaft and the motor shaft, the motor base comprising:

a rigid support journally supported for movement relative to the driven shaft axis, the rigid support having a free end adapted to carry the motor, the rigid support moving in response to movement of the exciter; and a resilient support having a first end attached to the free end of the rigid support and a fixed second end, the resilient support being sized to suspend the motor and rigid support and moving in response to movement of the exciter acting on the rigid support;

wherein the motor base maintains a constant center distance between the driven shaft axis and the motor shaft axis as the rigid support and the resilient support move in response to movement of the exciter.

2. The motor base of claim 1, in which the resilient support comprises a compression spring.

3. The motor base of claim 1, in which the rigid support comprises an arm having a fixed end supported to pivot about the driven shaft axis.

4. The motor base of claim 3, in which the exciter further comprises a bracket having a pair of side walls, each side wall defining an aperture aligned with the driven shaft axis, and the fixed end of the arm comprises a resilient connection member defining a center bore aligned with the apertures in the side walls, the motor base further comprising a pin sized for insertion through the apertures in the side walls and the center bore to pivotably attach the arm to the bracket.

5. The motor base of claim 4, in which the resilient connection member comprises a rubberized bushing.

6. The motor base of claim 3, further comprising a table attached to the free end of the rigid support, the table being sized to carry the motor.

7. The motor base of claim 1, in which the drive belt is a timing belt.

8. A motor base for use in vibratory apparatus having an eccentric drive mounted on an exciter, the eccentric drive including a driven shaft rotatably mounted on the exciter and disposed along a driven shaft axis, the exciter including a bracket attached thereto, a motor having a motor shaft disposed along a motor shaft axis, the motor shaft axis being spaced from and parallel to the driven shaft axis, and a drive belt operably coupled to the driven shaft and the motor shaft, the motor base comprising:

a rigid arm attached to the bracket and supported for movement relative to the driven shaft axis, the arm having a free end adapted to carry the motor and moving in response to movement of the exciter; and a spring having a first end attached to the free end of the arm and a fixed second end, the spring being sized to suspend the motor and moving in response to movement of the exciter acting on the arm;

wherein the motor base maintains a constant center distance between the driven shaft axis and the motor shaft axis as the arm and spring move in response to movement of the exciter.

9. The motor base of claim 8, in which the bracket comprises a pair of side walls, each side wall defining an aperture aligned with the driven shaft axis, and the fixed end of the arm comprises a resilient connection member defining a center bore aligned with the apertures in the side walls, the motor base further comprising a pin sized for insertion through the apertures in the side walls and the center bore to pivotably attach the arm to the bracket.

10. The motor base of claim 9, in which the resilient connection member comprises a rubberized bushing.

11. The motor base of claim 8, further comprising a table attached to the free end of the arm, the table being sized to carry the motor.

12. The motor base of claim 8, in which the drive belt is a timing belt.

13. A vibratory apparatus comprising:

a material-carrying member, an exciter resiliently connected to the material-carrying member, the exciter including a driven shaft journaled thereon and an eccentric weight mounted on the driven shaft, the driven shaft being rotatable about a driven shaft axis, wherein the eccentric weight generates a vibrational force which moves the exciter;

a rigid support journally supported for movement relative to the driven shaft axis, the rigid support having a free end spaced from the driven shaft axis, the rigid support moving in response to movement of the exciter;

a motor attached to the free end of the rigid support, the motor having a motor shaft with a motor shaft axis, the motor shaft axis being spaced from and parallel to the driven shaft axis;

a resilient support having a first end attached to the free end of the rigid support and a fixed second end, the resilient support being sized to suspend the motor and the rigid support and moving in response to movement of the exciter acting on the rigid support; and a drive belt operably coupled to the motor shaft and the driven shaft;

wherein the motor base maintains a substantially constant center distance between the driven shaft axis and the motor shaft axis as the rigid support and the resilient support move in response to movement of the exciter.

14. The vibratory apparatus of claim 13, in which the resilient support comprises a compression spring.

15. The vibratory apparatus of claim 13, in which the rigid support comprises an arm having a fixed end supported to pivot relative to the driven shaft axis.

16. The vibratory apparatus of claim 15, in which the exciter further comprises a bracket having a pair of side walls, each side wall defining an aperture aligned with the driven shaft axis, and the fixed end of the arm comprises a resilient connection member defining a center bore aligned with the apertures in the side walls, the apparatus further comprising a pin sized for insertion through the apertures in the side walls and the center bore to pivotably attach the arm to the bracket.

17. The vibratory apparatus of claim 15, further comprising a table attached to the free end of the rigid support, the table being sized to carry the motor.

18. The vibratory apparatus of claim 13, in which the drive belt is a timing belt.

19. The vibratory apparatus of claim 13, in which the exciter further includes a second driven shaft journaled thereon and an eccentric weight mounted on the second driven shaft, the second driven shaft being rotatable about a second driven shaft axis, the vibratory apparatus further comprising:

a second rigid support journally supported for movement relative to the second driven shaft axis, the second rigid support having a free end spaced from the second driven shaft axis, the second rigid support moving in response to movement of the exciter;

a second motor attached to the free end of the second rigid support, the second motor having a motor shaft disposed along a second motor shaft axis, the second motor shaft axis being spaced from and parallel to the second driven shaft axis;

a second resilient support having a first end attached to the free end of the second rigid support and a fixed second end, the second resilient support being sized to suspend the second motor and the second rigid support, and moving in response to movement of the exciter acting on the second rigid support; and a second drive belt operably coupled to the motor shaft of the second motor and the second driven shaft;

wherein the second motor base maintains a constant center distance between the second driven shaft axis and the motor shaft axis of the second motor as the second rigid support and the second resilient support move in response to movement of the exciter.

* * * * *